United States Patent
Maeda et al.

(10) Patent No.: US 9,524,121 B2
(45) Date of Patent: Dec. 20, 2016

(54) MEMORY DEVICE HAVING A CONTROLLER UNIT AND AN INFORMATION-PROCESSING DEVICE INCLUDING A MEMORY DEVICE HAVING A CONTROLLER UNIT

(71) Applicant: Kabushiki Kaisha Toshiba, Tokyo (JP)

(72) Inventors: Kenichi Maeda, Kanagawa (JP);
Nobuhiro Kondo, Kanagawa (JP);
Atsushi Kunimatsu, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 396 days.

(21) Appl. No.: 13/758,090

(22) Filed: Feb. 4, 2013

(65) Prior Publication Data

US 2013/0290647 A1 Oct. 31, 2013

Related U.S. Application Data

(60) Provisional application No. 61/639,454, filed on Apr. 27, 2012.

(51) Int. Cl.
*G06F 12/00* (2006.01)
*G06F 3/06* (2006.01)
*G06F 12/08* (2016.01)
*G06F 12/02* (2006.01)

(52) U.S. Cl.
CPC ......... *G06F 3/0646* (2013.01); *G06F 12/0246* (2013.01); *G06F 12/0866* (2013.01); *G06F 12/0864* (2013.01); *G06F 2212/311* (2013.01); *G06F 2212/466* (2013.01); *G06F 2212/7201* (2013.01)

(58) Field of Classification Search
CPC ............... G06F 12/0868; G06F 2212/2022; G06F 2212/225; G06F 2212/282
See application file for complete search history.

(56) References Cited

U.S. PATENT DOCUMENTS 6,219,073 B1    4/2001   Suzuoki
2007/0283108 A1*   12/2007   Isherwood et al. ........... 711/154
(Continued)

FOREIGN PATENT DOCUMENTS

| JP | 10-269165 | 10/1998 |
|----|-----------|---------|
| JP | 2013-33337 | 2/2013 |
| JP | 2013-109419 | 6/2013 |

OTHER PUBLICATIONS

Combined Chinese Office Action and Search Report issued on Jul. 17, 2015 in Chinese Patent Application No. 201210332970.2 with partial English translation and English translation of category of cited documents.

*Primary Examiner* — Gurtej Bansal
(74) *Attorney, Agent, or Firm* — Oblon, McClelland, Maier & Neustadt, L.L.P.

(57) ABSTRACT

According to one embodiment, a memory device is connectable to a host device. The memory device includes a first interface unit, a controller unit, a second memory and a second interface. The first interface unit receives a write command from the host device. The controller unit acquires the write-data associated with the write command stored in a first memory area of a first memory in the host device, the write-data being copied from a second memory area of the first memory. The second interface causes the second memory to write the write-data in the second memory.

12 Claims, 11 Drawing Sheets

(56) References Cited

U.S. PATENT DOCUMENTS

| | | | |
|---|---|---|---|
| 2008/0109606 A1* | 5/2008 | Lataille | G06F 12/12 |
| | | | 711/133 |
| 2010/0250836 A1 | 9/2010 | Sokolov et al. | |
| 2011/0066790 A1* | 3/2011 | Mogul et al. | 711/103 |
| 2013/0191609 A1 | 7/2013 | Kunimatsu et al. | |
| 2013/0198434 A1* | 8/2013 | Mylly | G06F 12/0246 |
| | | | 711/103 |

* cited by examiner

MEMORY DEVICE HAVING A CONTROLLER UNIT AND AN INFORMATION-PROCESSING DEVICE INCLUDING A MEMORY DEVICE HAVING A CONTROLLER UNIT

CROSS-REFERENCE TO RELATED APPLICATIONS

This application is based upon and claims the benefit of priority from U.S. Provisional Patent Application No. 61/639,454, filed on Apr. 27, 2012; the entire contents of which are incorporated herein by reference.

FIELD

Embodiments described herein relate generally to an information-processing device.

BACKGROUND

There is a technique called a UMA (unified memory architecture) that shares one memory among a plurality of computing processors, in a GPU (Graphical Processing Unit) which shares memory with a CPU. According to the UMA, a memory cost can be reduced compared with the case of having a dedicated memory for the GPU.

DETAILED DESCRIPTION

In general, according to one embodiment, a memory device is connectable to a host device. The memory device includes a first interface unit, a controller unit, a second memory and a second interface. The first interface unit receives a write command from the host device. The controller unit acquires the write-data associated with the write command stored in a first memory area of a first memory in the host device, the write-data being copied from a second memory area of the first memory. The second interface causes the second memory to write the write-data in the second memory.

Exemplary embodiments of an information-processing device will be explained below in detail with reference to the accompanying drawings. The present invention is not limited to the following embodiments.

Figure 1:
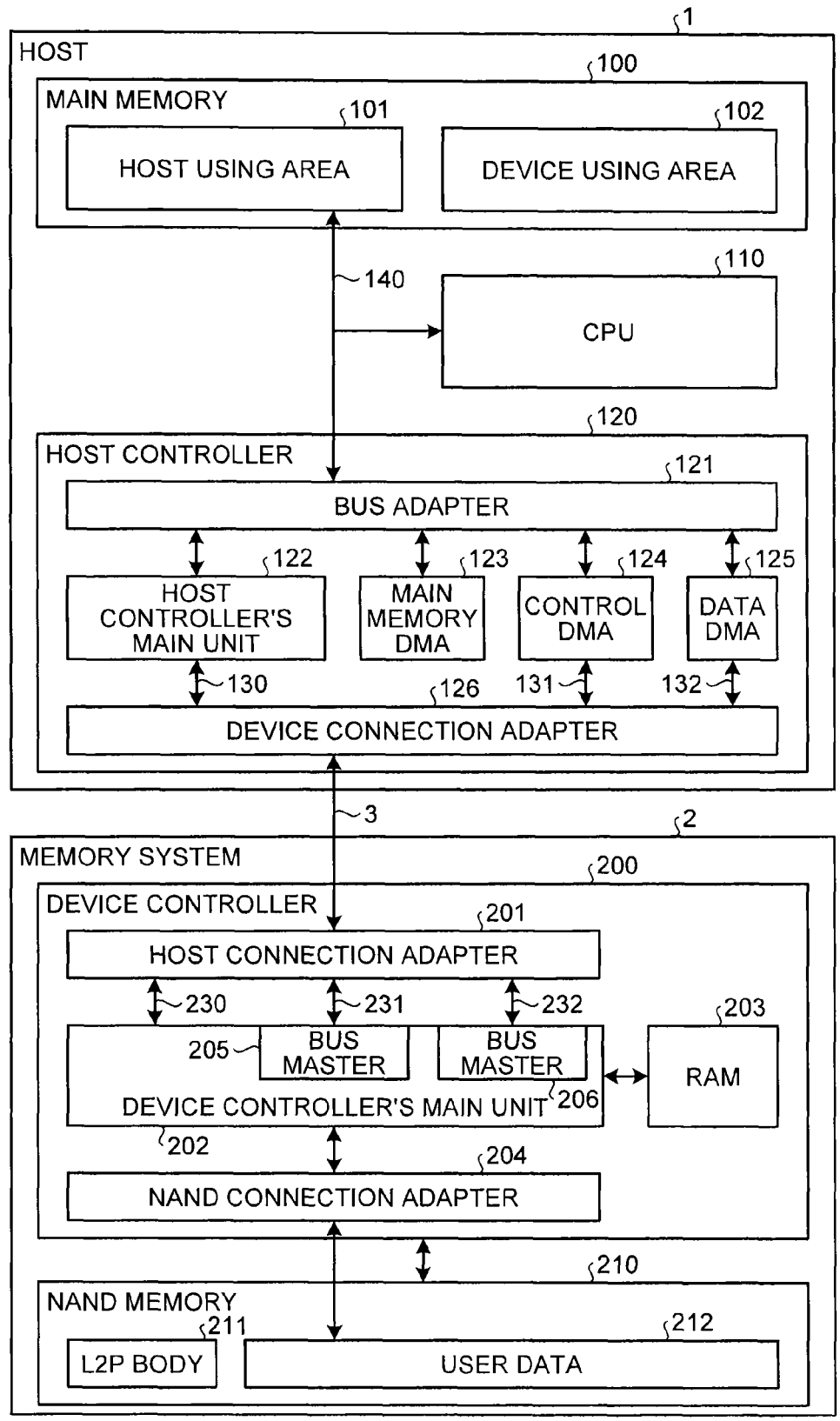
FIG. 1 is a diagram illustrating a configuration example of an information-processing device of an embodiment.

FIG. 1 illustrates a configuration example of an information-processing device of this embodiment. The information-processing device includes a host device (hereinafter, abbreviated as a host) 1 and a memory system (semiconductor memory device) 2 serving as a memory device of the host 1. A communication path 3 is connected between the host 1 and the memory system 2. A flash memory for built-in based on a UFS (Universal Flash Storage) standard or an SSD (Solid State Drive) can be applied to the memory system 2. The information-processing device is, for example, a PC, a cellular phone, an imaging device, and the like. As a communication standard of the communication path 3, for example, an MIPI (Mobile Industry Processor Interface) M-PHY is adopted.

The memory system 2 includes a NAND flash memory (NAND memory) 210 as the nonvolatile semiconductor memory and a device controller 200 that transmits data between the NAND memory 210 and the host 1.

The NAND memory 210 is configured by one or more memory chips having a memory cell array. The memory cell array is configured by arranging a plurality of memory cells in matrices. The individual memory cell arrays are configured by arranging a plurality of blocks as a data erasure unit. Further, each block is configured in a plurality of pages. Each page is the unit of writing and reading data.

The NAND memory 210 stores an L2P table 211 and user data 212 transmitted from the host 1. The user data 212 includes, for example, an operating system program (OS) providing an execution environment of the host 1, a user program which the host 1 executes on the OS, or data which the OS or the user program inputs/outputs.

The L2P table 211 is one of management information necessary for the memory system 2 to serve as an external memory device for the host 1 and is address conversion information in which a logical block address (LBA) which the host 1 uses at the time of accessing the memory system 2 corresponds to a physical address (block address+page address+a storage location in the page) in the NAND memory 210. A portion of the L2P table 211 is cached to an L2P cache area 300 to be described later. For discrimination from a content cached to the L2P cache area 300, the L2P table 211 stored in the NAND memory 210 is hereinafter referred to as an L2P body 211.

The device controller 200 includes a host connection adapter 201 as a connection interface of the communication path 3, a NAND connection adapter 204 as a connection interface to/from the NAND memory 210, a main unit 202 of the device controller that controls the device controller 200, and an RAM 203.

The RAM 203 is used as a buffer for storing data written to the NAND memory 210 and data read from the NAND memory 210. Further, the RAM 203 is used as a command queue that queues commands associated with a write request, a read request, and the like, which are input from the host 1. For example, the RAM 203 can be configured by a small-sized SRAM or DRAM. A register and the like can serve as a function of the RAM 203.

The device controller's main unit 202 controls data transmission between the host 1 and the RAM 203 through the host connection adapter 201 and controls data transmission between the RAM 203 and the NAND memory 210 through the NAND connection adapter 204. In particular, the device controller's main unit 202 serves as a bus master in the communication path 3 to/from the host 1 to transmit data by using a first port 230 and includes two additional bus masters 205 and 206. The bus master 205 can transmit data to/from the host 1 by using a second port 231, and the bus master 206 can transmit data to/from the host 1 by using a third port 232. Roles of ports 230 to 232 will be described below.

Further, the device controller's main unit 202 is configured by, for example, a microcomputer unit including a computation device and a memory device. The computation device executes firmware previously stored in the memory device, such that a function as the device controller's main unit 202 is implemented. The firmware can be stored in the NAND memory 210 by removing the memory device from the device controller's main unit 202. The device controller's main unit 202 can be configured by ASIC.

The host 1 includes a CPU 110 executing the OS and user programs, a main memory 100, and a host controller 120. The main memory 100, the CPU 110, and the host controller 120 are connected to one another through a bus 140.

The main memory 100 is configured by, for example, a DRAM. The main memory 100 has a host using area 101 and a device using area 102. The host using area 101 is used as a program development area when the host 1 executes the OS or user program and a work area at the time of executing a program developed in the program development area. The device using area 102 is used as a cache area for the management information of the memory system 2 and reading/writing. Herein, as one example of the management information cached from the memory system 2, the L2P table 211 is adopted. The write data is cached to the device using area 102.

Figure 2:
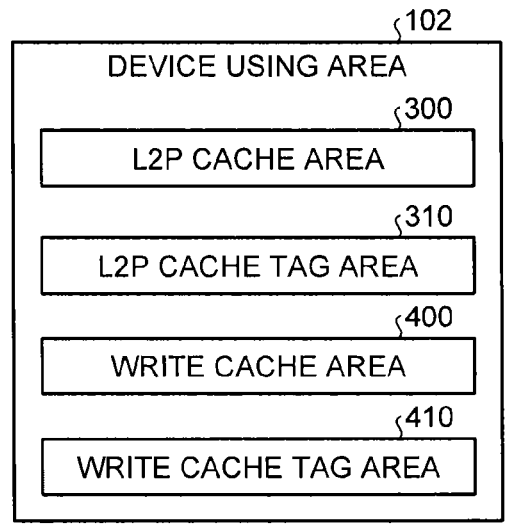
FIG. 2 is a diagram illustrating a memory structure of a device using area.

FIG. 2 is a diagram illustrating a memory structure of the device using area 102. As illustrated in FIG. 2, the device using area 102 includes an L2P cache area 300 to which some portions of the L2P body 211 are cached, an L2P cache tag area 310 storing tag information used for hit/miss judgment of the L2P cache area 300, a write cache area 400 which is a memory area having a cache structure in which the write data is buffered, and a write cache tag area 410 storing tag information used for hit/miss judgment of the write cache area 400.

Figure 3:
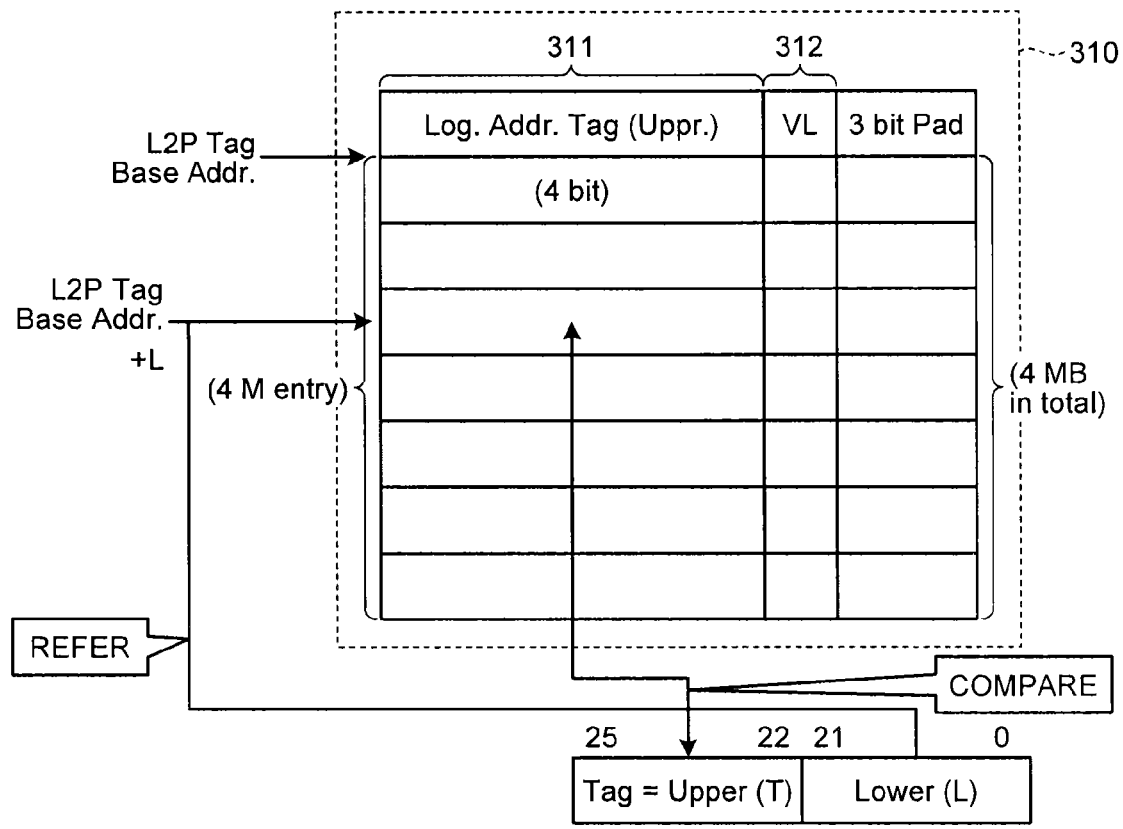
FIG. 3 is a diagram illustrating a memory structure of an L2P cache tag area.
Figure 4:
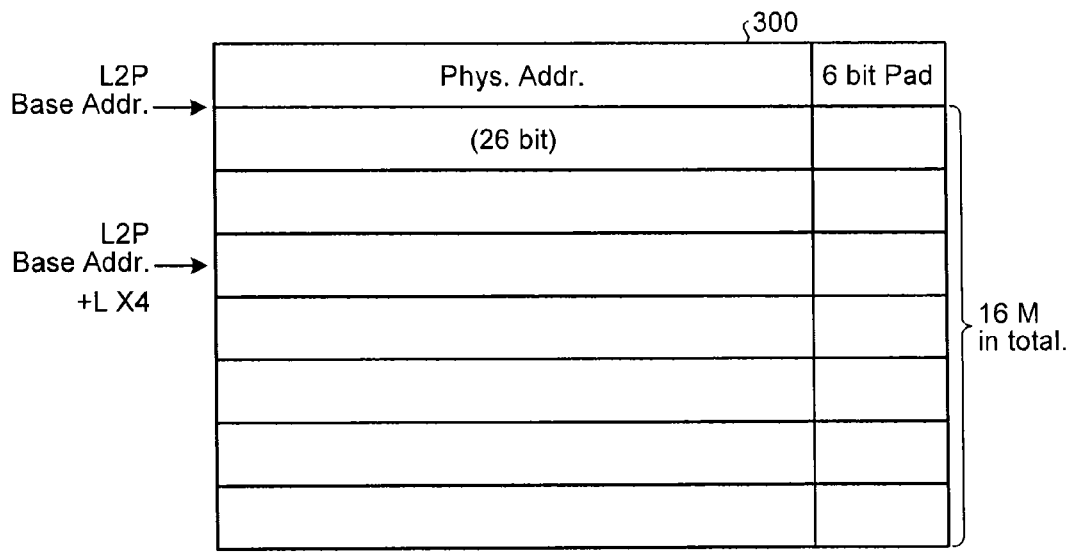
FIG. 4 is a diagram illustrating a memory structure of an L2P cache area.

FIG. 3 is a diagram illustrating a memory structure of the L2P cache tag area 310, and FIG. 4 is a diagram illustrating a memory structure of the L2P cache area 300. Herein, as one example, the LBA has a data length of 26 bits and the L2P cache area 300 is referred to by using a value of 22 bits at a low order side of the LBA. A value of 4 bits at a high order side of the LBA is marked with T, and the value of 22 bits at the low order side thereof is marked with L. The LBA is allocated for each page (herein, set as 4K bytes) constituting the NAND memory 210.

A physical address (Phys. Addr.) for one LBA is stored in individual cache lines constituting the L2P cache area 300, as illustrated in FIG. 4. The L2P cache area 300 is configured by cache lines of the number acquired by two to the twenty-second power. The individual cache lines have a capacity of 4 bytes which is the number of bytes as a size which is necessary and sufficient to store a physical address which has a data length of 26 bits. Therefore, the L2P cache area 300 has, in total, a size acquired by multiplying 4 bytes by two to the twenty-second power, that is, a size of 16M bytes. The L2P cache area 300 is configured to store a physical address corresponding to the LBA according to an order of a value of L. That is, the individual cache lines constituting the L2P cache area 300 are read by referring to an address acquired by adding a base address (L2P Base Addr.) of the L2P cache area 300 to 4*L. A residual area other than the area in which the physical address of 26 bits of the cache line of 4 bytes configuring the L2P cache area 300 is stored is marked with "Pad". Even in a subsequent table, the residual part is marked with "Pad".

As illustrated in FIG. 3, a value T as tag information for each cache line stored in the L2P cache area 300 is registered in the L2P cache tag area 310 in the order of an L value. Each entry has a field 311 storing the tag information and a field 312 storing VL (Valid L2P) bit indicating whether the cache line is effective. Herein, the L2P cache tag area 310 is configured, so that T registered in the L2P cache tag area 310 as the tag information coincides with a high-order digit T of the LBA corresponding to the physical address stored in a cache line (that is, a cache line referred to by using L) corresponding to the L2P cache area 300. That is, whether or not a physical address corresponding to a desired LBA is cached to the L2P cache area 300 is judged by referring to an address acquired by adding a base address (L2P Tag Base Addr.) of the L2P cache tag area 310 to the value of L configuring the desired LBA and whether or not tag information stored at the reference location coincides with the value of T configuring the desired LBA. When both values coincide with each other, it is judged that the physical address corresponding to the desired LBA is cached and when both values do not coincide with each other, it is judged that the physical address corresponding to the desired LBA is not cached. T is a value having a data length of 4 bits, and since a VL bit needs a capacity of 1 bit, each entry has a capacity of 1 byte. Therefore, the L2P cache tag area 310 has a size acquired by multiplying 1 byte by two to the twenty second, that is, a size of 4 M bytes.

Figure 5:
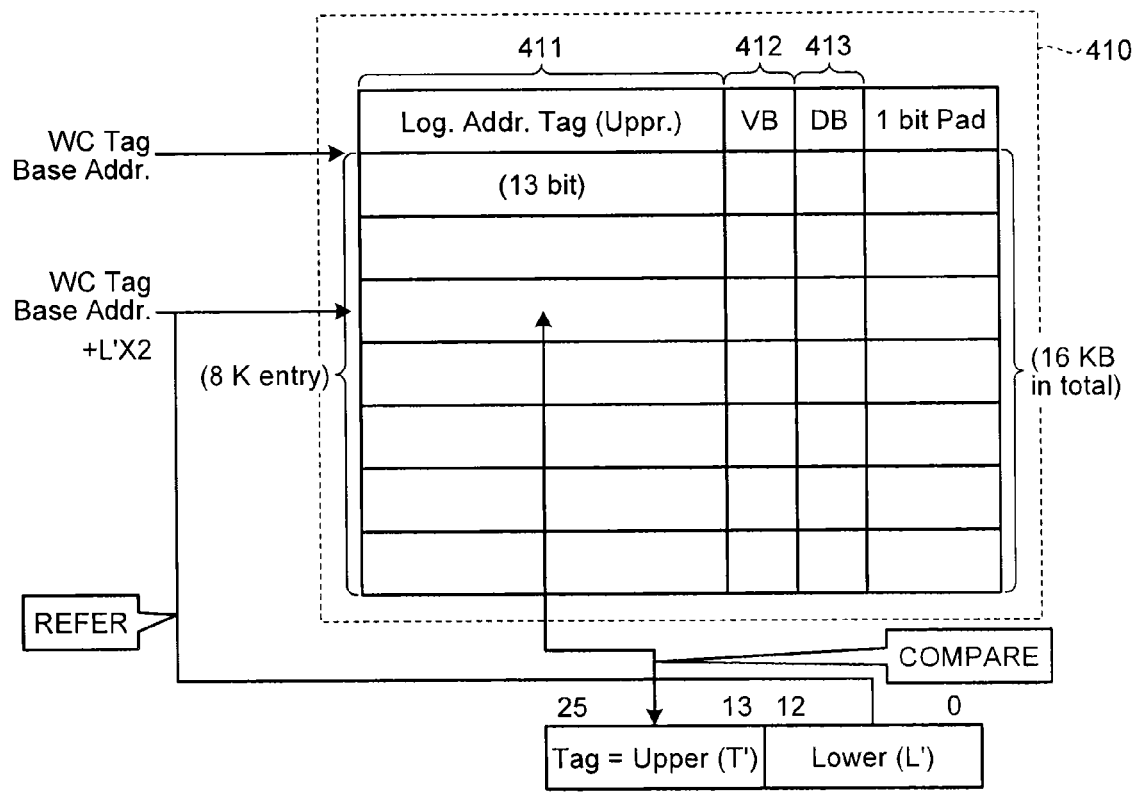
FIG. 5 is a diagram illustrating a memory structure of a write cache tag area.
Figure 6:
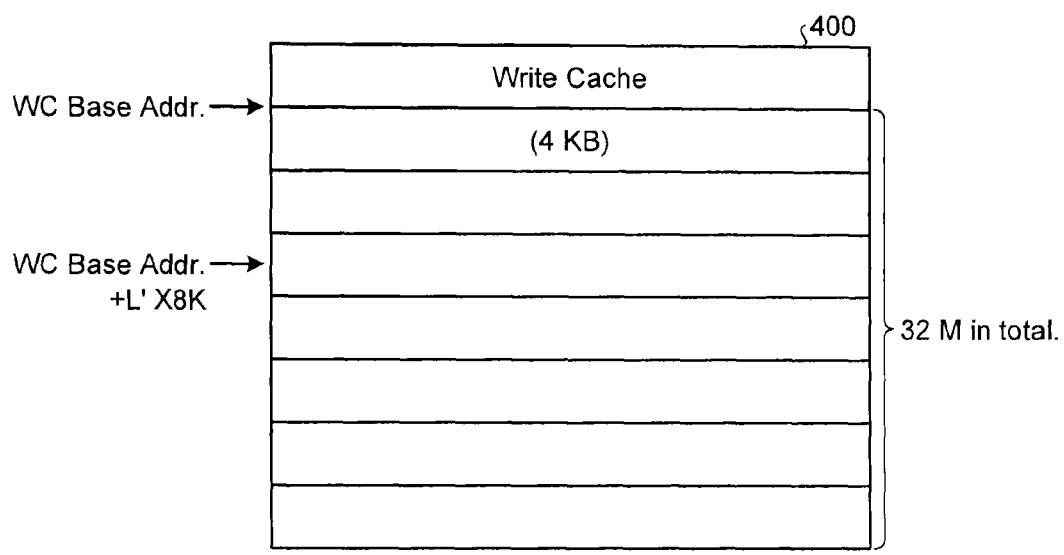
FIG. 6 is a diagram illustrating a memory structure of a write cache area.

FIG. 5 is a diagram illustrating a memory structure of the write cache tag area 410 and FIG. 6 is a diagram illustrating a memory structure of the write cache area 400. Herein, the write cache area 400 is referred to by using a value of 13 bits at a low order side of the LBA. A value of 13 bits at the high order side of the LBA is marked with T' and a value of 13 bits at the low order side thereof is marked with L'.

Write data having a page size is stored in the individual cache lines configuring the write cache area 400, as illustrated in FIG. 6. The write cache area 400 is configured by cache lines of the number acquired by two to the thirteenth power. Since the write data having the page size (herein, set as 4 K bytes) is cached to the individual cache lines, the write cache area 400 has, in total, a size acquired by multiplying 4 K bytes by two to the thirteenth power, that is, a size of 32 M bytes. The corresponding write data is stored in the write cache area 400 in the order of a value of L'. That is, the individual cache lines configuring the write cache area 400 are read by referring to an address acquired by adding a base address (WC Base Addr.) of the write cache area 400 to L'*4K.

As illustrated in FIG. 5, T' as tag information for each cache line stored in the write cache area 400 is registered in the write cache tag area 410 in the order of L'. Each entry has a field 411 storing the tag information, a field 412 storing a VB (Valid Buffer) bit indicating whether the cache line is effective, and a field 413 storing a DB (Dirty Buffer) bit indicating whether the cached write data is dirty or clean. The write cache tag area 410 is configured so that T' registered in the write cache tag area 410 as the tag information coincides with a high order digit T' of an LBA allocated to a storage destination page of the write data stored in the cache line (that is, the cache line referred to by using L') corresponding to the write cache area 400. That is, whether or not write data corresponding to a desired LBA is cached to the write cache area 400 is judged by referring to an address acquired by adding a base address (WC Tag Base Addr.) of the write cache tag area 410 to the value of L' configuring the desired LBA and whether or not tag information stored at the reference location coincides with the value of T' configuring the desired LBA. That the cache line is dirty indicates a state in which the write data stored in the cache line does not coincide with data stored in a corresponding address on the NAND memory 210 and that the cache line is clean means a state in which both sides coincide with each other. The dirty cache line is written back to the NAND memory 210, and as a result, the cache line becomes clean. Each tag information T' of the write cache tag area 410 has a data length of 13 bits, and each of the DB bit and the VB bit needs a size of 1 bit, and thus each entry has a capacity of 2 bytes. Therefore, the write cache tag area 410 has a size acquired by multiplying 2 bytes by two to the thirteenth, that is, a size of 16 K bytes.

The CPU 110 executes the OS or a user program to generate a write command to write data in the host using area 101 in the memory system 2 based on a request from the program. The generated write command is transmitted to the host controller 120.

Figure 7:
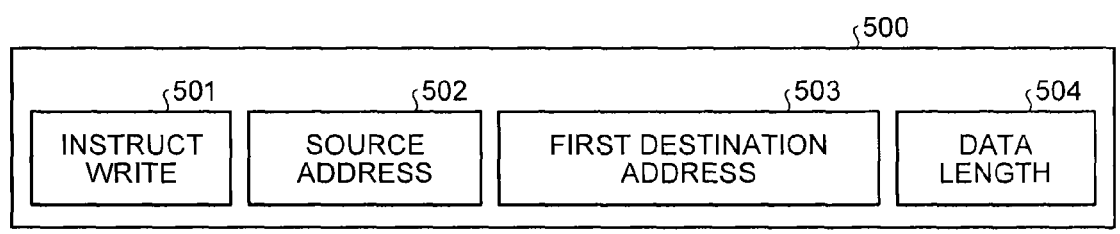
FIG. 7 is a diagram illustrating a data structure example of a write command.

FIG. 7 is a diagram illustrating a data structure example of the write command. As illustrated in FIG. 7, a write command 500 includes a write instruction 501 indicating that the command 500 instructs writing data, a source address 502 which is an address in the host using area 101 storing data to be written, a first destination address 503 indicating an address of a writing destination of the write data in the NAND memory 210, and a data length 504 of the write data. The first destination address 503 is marked with the LBA.

The host controller 120 includes a bus adapter 121 which is a connection interface of the bus 140, a device connection adapter 126 which is a connection interface of the communication path 3, and a host controller's main unit 122 that transmits data or commands to the main memory 100 or the CPU 110 through the bus adapter 121 or transmits data (including the commands) to the memory system 2 through the device connection adapter 126. The host controller's main unit 122 is connected with the device connection adapter 126 through a first port 130 and can transmit data to the memory system 2 through the first port 130.

The host controller 120 includes a main memory DMA 123 that transmits a DMA between the host using area 101 and the device using area 102, a control DMA 124 which captures a command which the memory system 2 transmits to access the device using area 102 or controls the host controller's main unit 122 to transmit status information depending on the device using area 102 to the memory system 2, and a data DMA 125 that transmits the DMA between the device using area 102 and the memory system 2. The control DMA 124 is connected with the device connection adapter 126 through a second port 131 and can transmit/receive the command or status information to/from the memory system 2 through the second port 131. The data DMA 125 is connected with the device connection adapter 126 through a third port 132 and can transmit/receive data to/from the memory system 2 through the third port 132.

By the functions of the device connection adapter 126 and the host connection adapter 201, the first port 130, the second port 131, and the third port 132 correspond to the first port 230, the second port 231, and the third port 232, respectively. In detail, the device connection adapter 126 sends a content, which is transmitted to the memory system 2 through the first port 130, to the device controller's main unit 202 through the first port 230. The device connection adapter 126 sends a content, which is transmitted to the memory system 2 through the second port 131, to the device controller's main unit 202 through the second port 231. The device connection adapter 126 sends a content, which is transmitted to the memory system 2 through the third port 132, to the device controller's main unit 202 through the third port 232. The device connection adapter 126 sends a content, which is transmitted to the host 1 through the first port 230, to the host controller's main unit 122 through the first port 130. The device connection adapter 126 sends a content, which is transmitted to the host 1 through the second port 231, to the control DMA 124 through the second port 131. The device connection adapter 126 sends a content, which is transmitted to the host 1 through the third port 232, to the data DMA 125 through the third port 132. The contents transmitted to the control DMA 124 and the data DMA 125 are, for example, sent to the host controller's main unit 122 through the bus adapter 121.

The ports 130 to 132 independently include input/output buffers used in communication with the memory system 2, respectively. The host controller's main unit 122, the control DMA 124, and the data DMA 125 are connected to the memory system 2 by using the individual input/output buffers, respectively, such that the host controller 120 can independently perform the communication with the memory system 2 using the host controller's main unit 122, the communication with the memory system 2 using the control DMA 124, and the communication with the memory system 2 using the data DMA 125. Since the communications can be switched without replacing data in the input/output buffers, the communication can be switched rapidly. The same can apply to the ports 230 to 232 included in the memory system 2.

The host controller's main unit 122 captures the write command 500 transmitted from the CPU 110 through the bus adapter 121 and reads the source address 502 and the first destination address 503 included in the captured write command 500. The host controller's main unit 122 calculates an address of a cache line to which the write data is buffered by using the first destination address 503. Herein, the calculated address of the cache line is referred to as a second destination address. The host controller's main unit 122 sets the source address 502 and the second destination address in the main memory DMA 123, and kicks (actuates) the main memory DMA 123. The host controller's main unit 122 deletes the source address 502 from the write command 500 and transmits the write command 500 to the memory system 2 through the device connection adapter 126.

When the main memory DMA 123 is kicked from the host controller's main unit 122, the main memory DMA 123 reads data from an address designated by the source address 502 of the host using area 101 and copies the read data to an address designated by the second destination address of the device using area 102. The main memory DMA 123 notifies transmission completion of the DMA to the host controller's main unit 122 by copy ending interruption.

The host controller's main unit 122 instructs the control DMA 124 to transmit a copy ending signal to the memory system 2 when transmission of the DMA by the main memory DMA 123 is completed. The device controller's main unit 202 acquires the write data stored in the address designated by the second destination address of the device using area 102 through the data DMA 125 when receiving the copy ending signal, and stores the acquired write data in an address designated by the first destination address 503 of the NAND memory 210.

The host controller's main unit 122 can receive various commands from the CPU 110 in addition to the write command 500. Herein, the host controller's main unit 122 enqueues the received command to the command queue to sequentially take out commands to be processed from a head of the command queue. An area storing the data structure of the command queue can be secured above the main memory 100 or can be configured by installing a small-sized memory or register in or around the host controller's main unit 122.

Communication paths between the host controller's main unit 122, and the main memory DMA 123, the control DMA 124, and the data DMA 125 are not limited to predetermined paths. For example, the bus adapter 121 can be used as the communication path or a dedicated line is installed, which can be used as the communication path.

Figure 8:
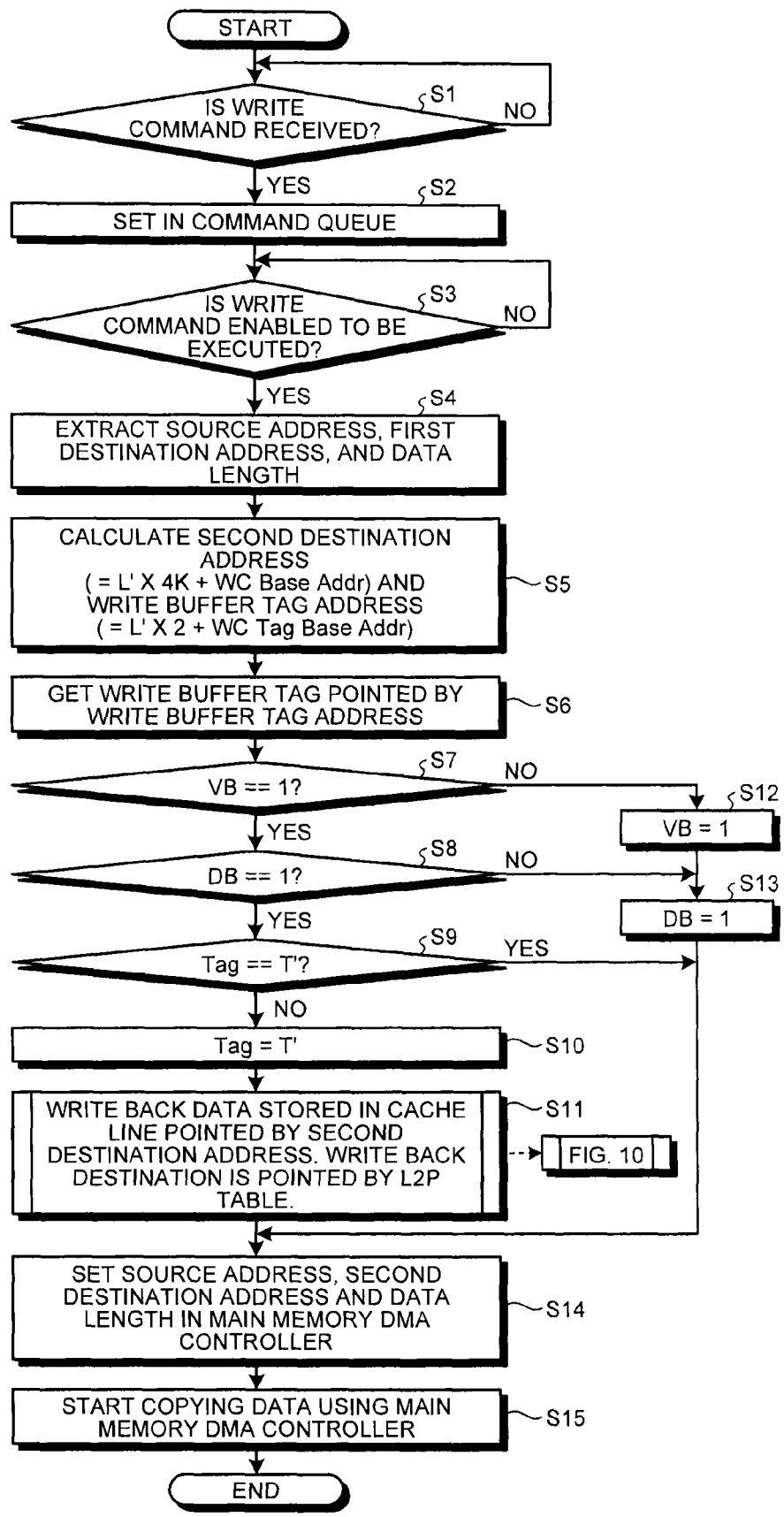
FIG. 8 is a flowchart illustrating an operation, in particular the write operation, of a main unit of a host controller until a main memory DMA is actuated.

Next, an operation of the information-processing device according to the first embodiment of the present invention will be described. FIG. 8 is a flowchart illustrating a write operation until the host controller's main unit 122 of the host 1 actuates the main memory DMA 123.

The host controller's main unit 122 waits for receiving the write command 500 (step S1, No), and when the host controller's main unit 122 receives the write command 500 as the write command 500 is issued from the CPU 110 (step S1, Yes), the host controller's main unit 122 stores the received write command 500 in the command queue (step S2).

The host controller's main unit 122 judges whether the write command 500 stored in the command queue is enabled to be executed (step S3) checking appropriate resources, e.g., DMA units 123, etc., and when the write command 500 is not enabled to be executed (step S3, No), the host controller's main unit 122 performs the judgment processing of step S3 again. The case where the write command 500 is enabled to be executed corresponds to a case where all commands enqueued earlier than the write command 500 are taken out and processing thereof is completed. When the write command 500 is enabled to be executed (step S3, Yes), the host controller's main unit 122 reads the source address 502, the first destination address 503, and the data length 504 which are included in the write command 500 (step S4).

The host controller's main unit 122 calculates the second destination address, which is the write cache line address, and the corresponding tag address (step S5). Then the host controller's main unit 122 reads the write buffer tag pointed by the tag address calculated in the last step (step S6).

The host controller's main unit 122 checks the value of VB (step S7). If the value is equal to "1" (step S7 Yes), which means the cache line is "valid", it checks the value of DB (step S8). If the value is equal to "1" (step S8 Yes), which means the cache line is "dirty", it checks the value of Tag (step S9). If the value is not equal to "T'" (step S9 No), which means the cache collision occurs, it writes back the cache line to the memory system 2 (step S11).

Figure 10:
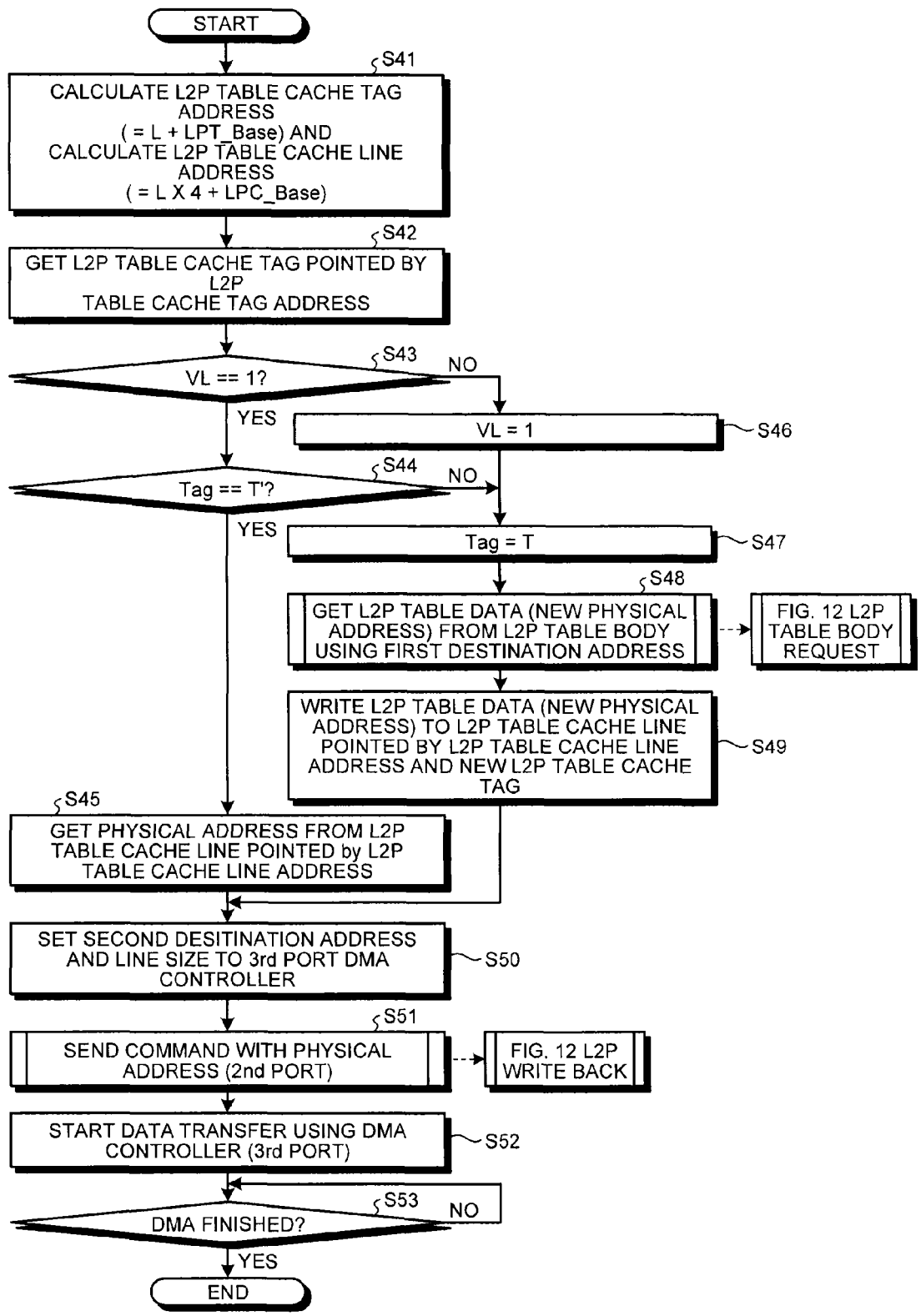
FIG. 10 is a flowchart illustrating a processing in which the host controller's main unit writes back data stored in a cache line to a memory system.

FIG. 10 is a flowchart, in more detail, illustrating the processing in which the host controller's main unit 122 sends the cache line to be written back to the memory system 2 in step S11. As illustrated in FIG. 10, the host controller's main unit 122 calculates the L2P table cache line address and corresponding tag address (step S41). Then it reads the L2P cache tag pointed by the tag address calculated in the previous step (step S42).

The host controller's main unit 122 checks the value of VL (step S43). If the value is equal to "1" (step S43 Yes), which means the cache line is "valid", it checks the value of Tag (step S44). If the value is equal to "T" (step S44 Yes), which means the cache hits, it reads the L2P table cache line to get the physical address (step S45). Set the second destination address, which is the write cache line address, and the line size to DMA unit 124 (step S50).

If the value of VL is not equal to "1" (step S43 No), which means cache misses, the host controller's main unit 122 set VL to "1" for preparing the new value to be cached (step S46).

If the value of Tag is not equal to "T" (step S44 No), which means cache collision occurs, the host controller's main unit 122 sets Tag to "T" for preparing the new value to be cached (step S47). Then it requests the memory system to send the physical address corresponding to the first destination address (step S48).

Figure 12:
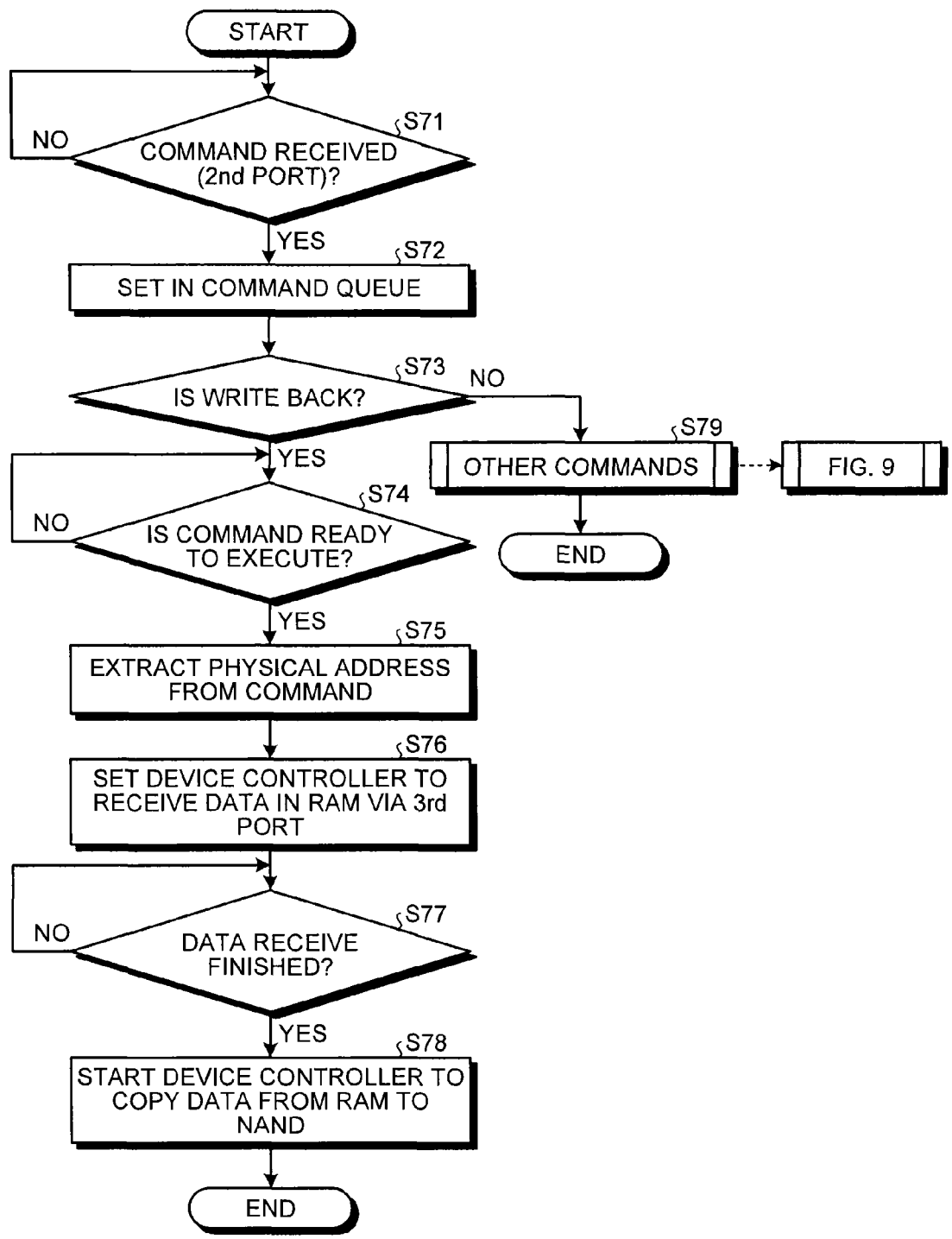
FIG. 12 is a diagram illustrating operations, in particular the write back operation as the main flow, in a device controller's main unit.

FIG. 12 is a flowchart, in more detail, illustrating the process in which the device controller's main unit 206 receives a command from the host 1 and executes the command, the main part of which is to get the physical address corresponding to the first destination address from the L2P table body 211. As illustrated in FIG. 12, the device controller's main unit 206 waits for receiving a command (step S71 No), and when a command is received (step S71 Yes), it sets the command in the command queue (step S72). Then the device controller's main unit 206 checks if the command is "Write Back" (step S73). If the command is "Write Back" (step S73 Yes), the device controller's main unit 206 waits for the command to be ready to execute (step S74 No), and when it is ready (step S74 Yes), the device controller's main unit 206 reads the physical address of NAND memory 210 from the command (step S75). Then the device controller's main unit 206 sets the bus master 206 to prepare for receiving data via the 3rd port 232 (step S76) from the host 1 to RAM 203. The device controller's main unit 206 waits for finishing data transfer (step S77 No), and when the data transfer finishes (step S77 Yes), it starts to copy the data from RAM 203 to NAND memory 210 (step S78).

If the received command is not "Write Back" (step S73 No), it starts other commands operation (step S79).

Figure 9:
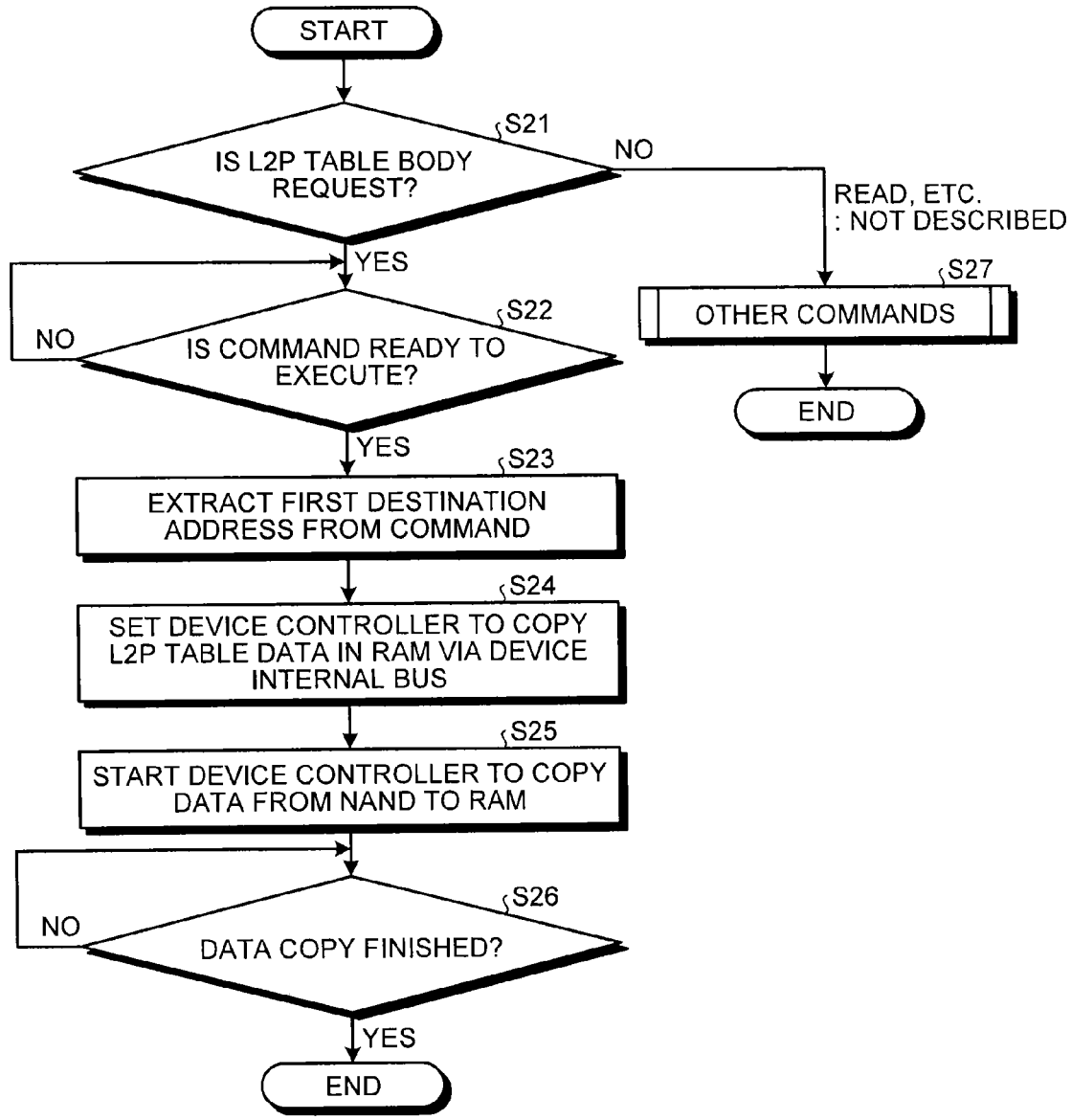
FIG. 9 is a flowchart illustrating a processing in which the device controller's main unit refers to an L2P body and send to the host.

FIG. 9 is a flowchart, in more detail, illustrating the processing in which the device controller's main unit 206 executes command other than "Write Back" in step S79. As illustrated in FIG. 9, the device controller's main unit 206 checks if the command is "L2P Table Body Request" (step S21). If the command is "L2P Table Body Request" (step S21 Yes), the device controller's main unit 206 waits for the command to be ready to execute (step S22 No), and when the command is ready to execute (step S22 Yes), it read the first destination address, which is the logical address, from the command (step S23). Then the device controller's main unit 206 sets it to copy the L2P table contents, which is a physical address from the L2P table body 211 in NAND memory 210 to RAM 203 (step S24), and start copying (step S25). The device controller's main unit 206 waits for copy to finish (step S26 No), and when it finishes (step S26 Yes), the process ends.

If the command is not "L2P Table Body Request" (step S21 No), the command will be one of other commands, e.g., "Read", etc. The commands are executed in a similar way described above.

After the above process, the host controller's main unit 122 sets the new L2P table data, which is a physical address, and the corresponding new Tag to the L2P table cache line and the corresponding Tag area, respectively.

Then the host controller's main unit 122 sets the second destination address and write cache size to the DMA unit 125. It sends the command with the physical address to the memory system 2 via the DMA unit 124 (step S51) and starts the DMA unit 125 (step S52).

The corresponding part of steps S51 and S52 in memory system 2 is illustrated in FIG. 12 as described before.

Then the host controller's main unit 122 waits for the DMA to finish (step S53 No), and when it finishes, the process ends.

If the value of VB is not equal to "1" (step S7 No) in FIG. 8, which means the write cache line is invalid, the host controller's main unit 122 sets VL to "1" for preparing the new write cache line (step S12). If the value of DB is not equal to "1" (step S8 No), which means the write cache is not dirty or written before, it sets DB to "1" for preparing the new write cache line (step S13).

After the step S11 or S13, the host controller's main unit 122 sets the source address from the Write command, the second destination address, and the length of the data to be written to the DMA unit 123 (step S14), and start copying by DMA (step S15).

Figure 11:
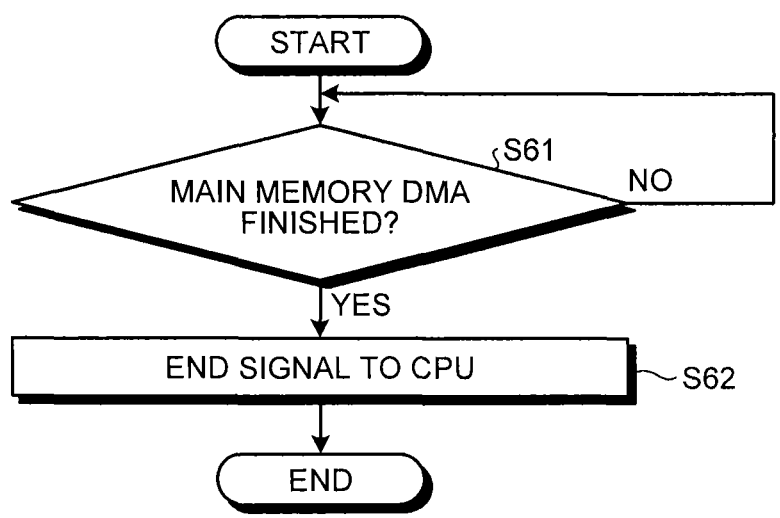
FIG. 11 is a flowchart illustrating an operation of the host controller's main unit after the main memory DMA is actuated.

FIG. 11 is a flowchart illustrating an operation after the host controller's main unit 122 of the host 1 actuates the main memory DMA 123. As illustrated in FIG. 11, the host controller's main unit 122 monitors the copy ending interruption from the main memory DMA 123 (step S61, No), and when the copy ending interruption is received (step S61, Yes), the host controller's main unit 122 transmits the copy ending signal to the memory system 2 through the second port 131 (step S62) and ends the operation.

As such, the host 1 is configured to include a main memory 100 having the host using area 101 and the write cache area 400, the CPU 110 as a first host control unit that generates the write data for the memory system 2 in the host using area 101 and generates the write command 500 to write the write data in the NAND memory 210 by designating the first destination address 503 which is a logical address of the writing destination of the NAND memory 210, and the host controller's main unit 122 as the second host control unit that transmits the write data to the cache line of the write cache area 400 corresponding to the first destination address 503 designated by the write command 500 by reading the write data from the host using area 101 as well as transmitting the write command 500 generated by the CPU 110 to the memory system 2, and the memory system 2 is configured to include the device controller's main unit 202 as the device control unit that transmits the write data cached to the write cache area 400 to the memory system 2 through the host 1 at the time of executing the write command 500 received from the host 1 and writes the transmitted write data at the location designated as the first destination address 503 of the NAND memory 210, and thus the area to which the write data is buffered is configured by the cache and the area is provided in the main memory 100, thereby using the main memory efficiently as possible.

The host 1 is configured to include the write cache tag area 410 as a first management information memory area memorizing the DB bit, which indicates for each cache line whether the cache line configuring the write cache area 400 is dirty or clean, and the host controller's main unit 122 is configured to refer to the DB bit depending on the cache line corresponding to the first destination address 503 to judge whether or not the cache line is vacant, and thus the host controller's main unit 122 can efficiently verify whether or not the cache line is vacant.

Since the device controller's main unit 202 is configured to write the write data in the NAND memory 210 from the cache line corresponding to the first destination address 503 and thereafter, set the DB bit depending on the cache line as 0 (clean), the device controller's main unit 202 can manage the write cache tag area 410 so that the host controller's main unit 122 can efficiently verify whether or not the cache line is vacant.

Since the host controller's main unit 122 is configured to judge that the cache line corresponding to the first destination address 503 is vacant to transmit the write data to the cache line when the DB bit depending on the cache line corresponding to the first destination address 503 is 0 and vacate the cache line by transmitting the data stored in the cache line to the memory system 2 before transmitting the write data to the cache line when the DB bit is 1 and thereafter, transmit the write data to the cache line, the host controller's main unit 122 can write back the write cache area 400.

Since the write cache tag area 410 is configured to memorize the tag information to correspond to the low order digit of the logical address of the NAND memory 210 for each cache line of the write cache area 400 and memorize the DB bit to correspond to each tag information, and the host controller's main unit 122 and the device controller's main unit 202 are configured to refer to the DB bit depending on the cache line corresponding to the first destination address 503 by using the low order digit of the first destination address 503, the host controller's main unit 122 and the device controller's main unit 202 can efficiently specify a desired storage location of the DB bit.

Since the device controller's main unit 202 is configured to judge whether or not the tag information corresponding to the low order digit of the first destination address 503 coincides with the high order digit of the first destination address 503, judge whether the corresponding cache line is vacant by referring to the DB bit when both sides do not coincide with each other, and transmit the write data to the cache line without judging whether or not the cache line corresponding to the first destination address 503 is vacant, when both sides coincide with each other, the device controller's main unit 202 can efficiently manage the write cache area 400.

Since the host controller's main unit 122 is configured to vacate the cache line by transmitting the data stored in the cache line corresponding to the first destination address 503 to the memory system 2 and thereafter, set the DB bit depending on the cache line as 0 and transmit the write data to the cache line corresponding to the first destination address 503 and thereafter, set the DB bit depending on the cache line as 1, the host controller's main unit 122 can efficiently manage the write cache area 400.

Since the NAND memory 210 is configured to memorize the L2P body 211 that describes a correspondence between a logical address and a physical address of the memory 210 itself for each logical address, the main memory 100 is configured to further include the L2P cache area 300 that caches a portion of the L2P body 211, and the device controller's main unit 202 is configured to acquire a physical address corresponding to the first destination address 503 of the NAND memory 210 by referring to the L2P cache area 300 and write the write data at a location designated by the acquired physical address, the cache area of the L2P body 211 can be provided in the main memory 100 which can have a large capacity at lower cost than the RAM 203 of the memory system 2, thereby making it possible to manufacture the information-processing device inexpensively.

The device controller's main unit 202 is configured to read the physical address corresponding to the first destination address 503 from the L2P cache area 300 when the first destination address 503 hits the L2P cache area 300 and read the physical address corresponding to the first destination address 503 in the L2P body 211 memorized by the NAND memory 210 when the first destination address 503 does not hit the L2P cache area 300, and simultaneously, write the read physical address in the cache line corresponding to the L2P cache area 300.

The host 1 is configured to further include the main memory DMA 123 that transmits data between the host using area 101 and the write cache area 400 and the data DMA 125 that transmits data between the write cache area 400 and the memory system 2, the host controller's main unit 122 is configured to transmit the write data stored in the host using area 101 to the write cache area 400 by operating the main memory DMA 123, and the device controller's main unit 202 is configured to transmit the write data stored in the write cache area 400 to the NAND memory 210. As a result, for example, when a manufacturer wants to place the device using area 102 in the main memory, the manufacturer turns on the function of the main memory DMA 123 or the data DMA 125 and when the manufacturer does not place the device using area 102 in the main memory, the manufacturer turns on the function of the main memory DMA 123 or the data DMA 125 to both access the memory system 2 capable of using the device using area 102 placed in the main memory 100 and access a memory system that does not use the device using area 102 placed in the main memory 100.

Since the host controller's main unit 122 is configured to specify the address (second destination address) of the cache line storing the write data to be written by the write command 500 among the cache lines constituting the write cache area 400 by using the first destination address 503 and actuate transmission by the main memory DMA 123 by using the specified second destination address as the transmission destination of the write data, data can be transmitted between the host using area 101 and the device using area 102 without the memory system 2.

In the above description, as one example of the management information of the memory system 2 stored in the device using area 102, cache data of the L2P body 211 has been described, but other management information such as a defective block table in which information specifying a defective block is recorded can also be stored in the device using area 102. Even in this case, an area storing the other management information can be configured by the configuration of a cache memory.

As the data stored in the device using area 102, the write data has been described, but a mobile buffer where mobile data moved from one block to another block by garbage collection or mobile data moved from a block serving as the defective block to a good block is temporarily stored can be secured in the device using area 102. In this case, the mobile buffer can be configured by the configuration of the cache memory.

Since a large-capacity temporary memory can be mounted in the host 1 at lower cost than the memory system 2 in the first embodiment, it is described that the host 1 includes the area (the L2P cache tag area 310 or the write cache tag area 410) storing the tag information, but the memory system 2 can be configured to include a part or the entirety of the area storing the tag area.

For example, when the L2P cache tag area 310 is secured in the RAM 203, the L2P cache tag area 310 can be configured by an area having a smaller size than that of the first embodiment.

As explained above, the main memory DMA 123 copies the data from the address designated by the source address of the host using area 101 to the address designated by the second destination address of the device using area 102. This copying operation is referred to as a "Copy Data operation" hereinafter. In the embodiment explanation above, the host controller's main unit 122 initiates and controls the Copy Data operation. In other implementation, the device controller's main unit 202 can initiate and control the Copy Data operation. In such case, the host controller's main unit 122 transmits the write command, which contains the second destination address, data length and a task ID, to device controller's main unit 202. After device controller's main unit 202 receives the write command, the device controller's main unit 202 sends a command to host to cause host to set the second destination address and data length extracted from the write command to the main memory DMA 123 and host controller's main unit 122 also sets source address extracted from the same write command to the main memory DMA 123, so that the main memory DMA 123 can perform the Copy Data operation. It is implemented to ensure that the second destination address and data length given by the device controller's main unit 202 and the source address given by the main memory DMA 123 are from the same write command by using the task ID. Tag checking operation can also be transferred to device in a similar way as the above. After Copy Data operation is performed by the main memory DMA 123, the device controller's main unit 202 sets a transfer command and the second destination address in the control DMA 125 to receive the write data stored in the device using area 102 and then write acquired write data at position indicated by physical address in NAND memory.

In the embodiment explained above, logical cache is adopted. With the logical cache, write cache area 400 and write cache tag area 410 are referred using logical address. In other implementation, it is also possible to adopt physical cache, with which the write cache area 400 and the write cache tag area 410 are referred using physical address. In physical cache case, it is required to first refer the L2P cache area 300 to acquire physical address to refer to the write cache area 400 and write cache tag area 410.

Figure 13:
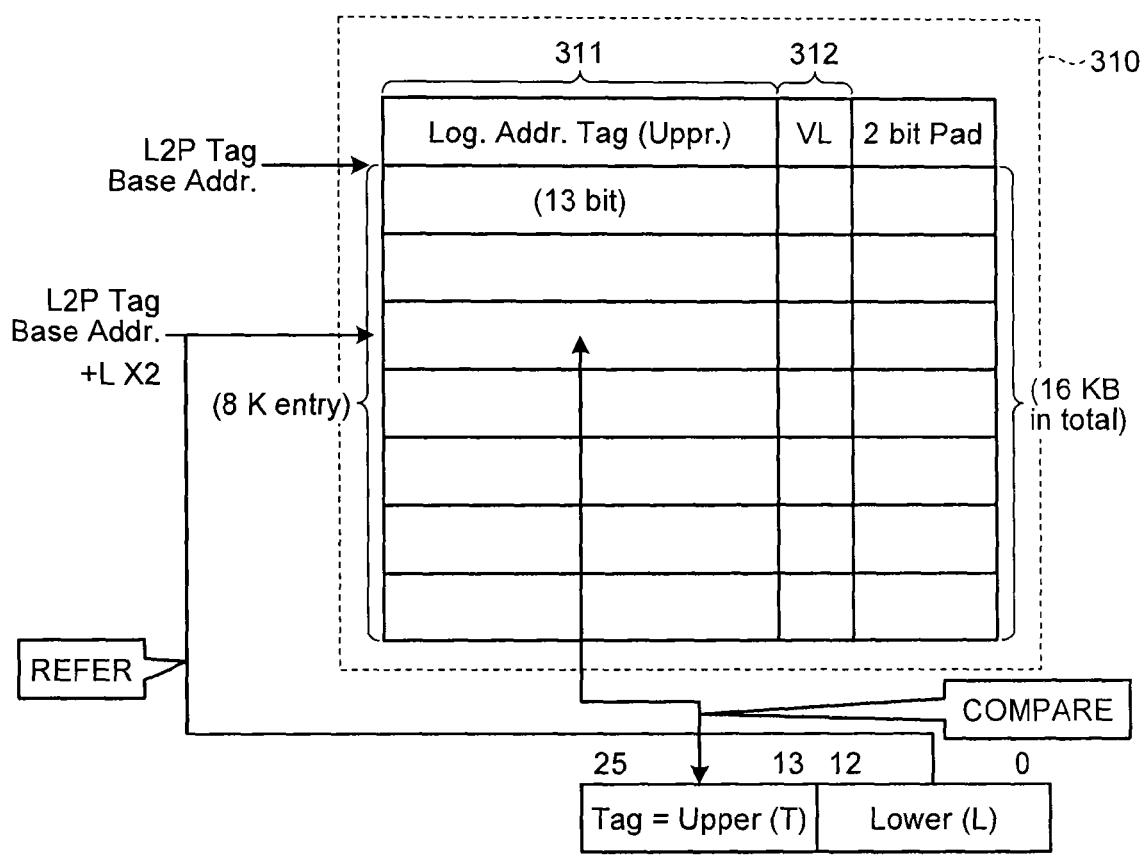
FIG. 13 is a diagram illustrating a memory structure of an L2P cache tag area of a second embodiment.
Figure 14:
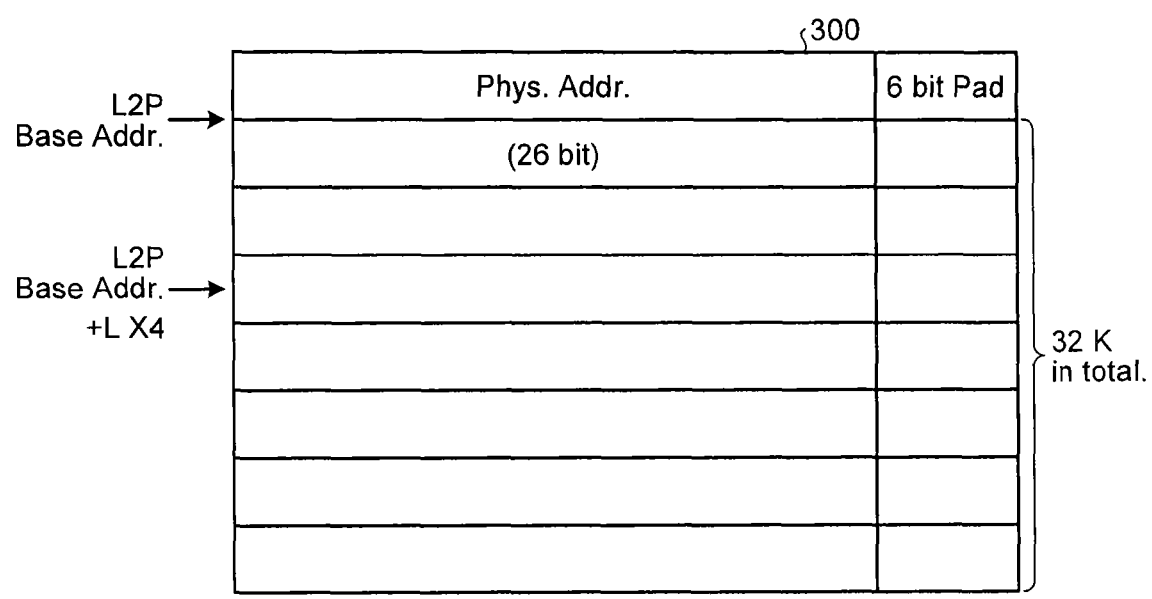
FIG. 14 is a diagram illustrating a memory structure of an L2P cache area of the second embodiment.

FIG. 13 is a diagram illustrating a memory structure of the L2P cache tag area 310 according to the second embodiment and FIG. 14 is a diagram illustrating a memory structure of the L2P cache area 300 according to the second embodiment. Herein, since the size of the L2P cache tag area 310 is smaller than that of the first embodiment, the L2P cache tag area 310 is referred to by using L', the value of 13 bits at the low order side of the LBA, which has a smaller data length than that of the first embodiment. 13 bits at the high order side of the LBA is marked with T'.

As illustrated in FIG. 14, the L2P cache area 300 according to the second embodiment is configured by cache lines of the number which is acquired by two to the thirteenth. Each cache line has a capacity of 4 bytes as in the first embodiment. Therefore, the L2P cache area 300 has, in total, a size acquired by multiplying 4 bytes by two to the thirteenth, that is, a size of 32 K bytes. That is, the individual cache lines constituting the L2P cache area 300 are read by referring to an address acquired by adding a base address (L2P Base Addr.) of the L2P cache area 300 to 4*L'.

As illustrated in FIG. 13, T', a value as tag information for each cache line stored in the L2P cache area 300 is registered in the L2P cache tag area 310 in the order of an L' value. Since T', the value of 13 bits is stored as the tag information, each entry has a capacity of 2 bytes. Therefore, the L2P cache tag area 310 has a size acquired by multiplying 2 bytes by two to the twenty second, that is, a size of 16 K bytes. Since the L2P cache tag area 310 according to the first embodiment has the size of 4 M bytes, the size of the L2P cache tag area 310 is decreased according to the second embodiment. Therefore, the L2P cache tag area 310 can be provided in the memory system 2 without making the RAM 203 have the large capacity.

The size of the write cache tag area 410 according to the first embodiment is also 16 K bytes and is substantially smaller than the size of the L2P cache tag area 310 according to the first embodiment. Therefore, the write cache tag area 410 can be provided in the memory system 2 together with the L2P cache tag area 310. In this case, the size of the write cache tag area 410 can be further decreased. The L2P cache tag area 310 can be provided in the host 1 and the write cache tag area 410 can be provided in the memory system 2.

When the size of the area storing the tag information is decreased, a cache hit rate is decreased. In this case, by increasing the size of the cache line, deterioration in efficiency due to the decrease in cache hit rate can be supplemented. For example, according to the description of the first embodiment, in the L2P cache area 300, one physical address has been cached to the individual cache line, but the plurality of entries of the L2P body 211, that is, the plurality of physical addresses can be cached. When the sizes of the individual cache lines coincide with the page sizes, the unit of the write-back of the cache line coincides with the writing unit size of the NAND memory 210, thereby making it possible to more efficiently manage the cache.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information-processing device, comprising:
a host device; and
a memory device,
wherein the host device includes
    a first memory which has a first memory area and a second memory area,
    a first controller unit which transmits a write command to the memory device through a first port,
    a first DMA which executes data-transfer between the second memory area and the memory device through a second port different from the first port, and the memory device includes
    a first interface unit which receives the write command from the host device through the first port,
    a second controller unit, which is included in the memory device and which acquires, through the second port, write-data associated with the write command stored in the first memory area of the first memory in the host device, the write-data having been copied from the second memory area of the first memory,
    a second memory, and
    a second interface which causes the write-data to be written in the second memory.

2. The information-processing device according to claim 1, wherein the memory device uses the first memory area of the first memory as work area.

3. The information-processing device according to claim 1, wherein the second controller unit acquires the write-data from the first memory area of the first memory by using a logical address which received with the write command from the host device.

4. The information-processing device according to claim 1, wherein the memory device is connected to the host device by a Mobile Industry Processor Interface (MIPI).

5. The information-processing device according to claim 1, wherein the second controller unit transmits a request for acquiring the write-data to the host device through a third port different from the first and second port.

6. The information-processing device according to claim 1, wherein the second controller unit acquires the write-data from the first memory area of the first memory by using a physical address, the physical address being obtained by using a logical address which received with the write command from the host device.

7. The information-processing device according to claim 6, wherein the second controller unit obtains the physical address by using translation table which is stored in the first memory area of the first memory through the second port.

8. The information-processing device according to claim 1, wherein the second controller unit acquires the write-data after the write-data is copied to the first memory area of the first memory from the second memory area of the first memory by the host device.

9. The information-processing device according to claim 8, wherein the host device further includes a second DMA which copies the write-data from the second memory area to the first memory area.

10. The information-processing device according to claim 9, wherein the first controller unit transmits, through a third port different from the first and second port, to the memory device, a notice after the second DMA completes the copy of the write-data.

11. An information-processing device, comprising:
a host device; and
a memory device,
wherein the host device includes
    a first memory which has a first memory area and a second memory area,
    a first controller unit which copies the write-data associated with a write command to the first memory area of the first memory from the second memory area of the first memory, and transmits the write command to the memory device through a first port,
    a DMA which executes data-transfer between the second memory area and the memory device through a second port different from the first port, and
the memory device includes
    a first interface unit which receives the write command from the host device through the first port,
    a second controller unit, which is included in the memory device and which acquires, through the second port, the write-data associated with the write command stored in the first memory area of the first memory in the host device,
a second memory, and
a second interface which causes the write-data to be written in the second memory.

12. The information-processing device according to claim 11, wherein the memory device is connected to the host device by a Mobile Industry Processor Interface (MIPI).

* * * * *